United States Patent [19]

Weder et al.

[11] Patent Number: 5,716,474
[45] Date of Patent: Feb. 10, 1998

[54] METHOD OF FORMING A FLOWER POT COVER

[75] Inventors: Donald E. Weder, Highland; Lisa A. Straeter, Breese, both of Ill.

[73] Assignee: Southpac Trust International, Inc.

[21] Appl. No.: 135,824

[22] Filed: Oct. 12, 1993

Related U.S. Application Data

[63] Continuation-in-part of Ser. No. 24,573, Mar. 1, 1993, abandoned, Ser. No. 968,798, Oct. 30, 1992, Pat. No. 5,369,934, Ser. No. 965,585, Oct. 23, 1992, abandoned, and Ser. No. 889,654, May 27, 1992, Pat. No. 5,332,610, which is a continuation of Ser. No. 677,225, Mar. 29, 1991, Pat. No. 5,199,242, said Ser. No. 24,573, is a continuation of Ser. No. 464,694, Jan. 16, 1990, Pat. No. 5,208,027, which is a continuation of Ser. No. 219,083, Jul. 13, 1988, Pat. No. 4,897,031, which is a continuation of Ser. No. 4,275, Jan. 5, 1987, Pat. No. 4,773,182, which is a continuation of Ser. No. 613,080, May 22, 1984, abandoned, said Ser. No. 968,798, is a continuation of Ser. No. 865,563, Apr. 9, 1992, Pat. No. 5,245,814, which is a continuation of Ser. No. 649,379, Jan. 31, 1991, Pat. No. 5,111,638, which is a continuation of Ser. No. 249,761, Sep. 26, 1988, abandoned, said Ser. No. 965,585, is a continuation of Ser. No. 893,586, Jun. 2, 1992, Pat. No. 5,181,364, which is a continuation of Ser. No. 707,417, May 28, 1991, abandoned, which is a continuation of Ser. No. 502,358, Mar. 29, 1990, abandoned, and a continuation-in-part of Ser. No. 249,761, Sep. 26, 1988, abandoned.

[51] Int. Cl.⁶ .............................. A01G 9/02; B32B 31/04
[52] U.S. Cl. ................... 156/211; 156/212; 156/215; 47/72
[58] Field of Search ............... 156/212, 242, 156/245, 211, 215; 47/72; 220/678–680; 206/423; 383/907; 229/87.01; D1/102, 105; D6/403

[56] References Cited

U.S. PATENT DOCUMENTS

| | | | |
|---|---|---|---|
| D. 239,192 | 3/1976 | Wiles et al. | D35/3 A |
| D. 279,279 | 6/1985 | Wagner | D11/143 |
| D. 289,024 | 3/1987 | Vaughn | D11/164 |
| 681,066 | 8/1901 | Millingar | |
| 1,708,752 | 4/1929 | Caras | |
| 1,951,642 | 3/1934 | Augustin et al. | 47/34 |
| 4,170,618 | 10/1979 | Adams | 47/72 |
| 4,223,480 | 9/1980 | Welty | 47/73 |
| 4,773,182 | 9/1988 | Weder et al. | 47/72 |
| 4,795,601 | 1/1989 | Cheng | 47/72 |
| 5,018,300 | 5/1991 | Chiu et al. | 47/67 |
| 5,076,011 | 12/1991 | Stehouwer | 47/72 |
| 5,076,874 | 12/1991 | Weder | 156/212 |
| 5,085,003 | 2/1992 | Garcia | 47/72 |
| 5,106,449 | 4/1992 | Fazzina et al. | 47/72 |
| 5,120,382 | 6/1992 | Weder | 47/72 |
| 5,152,101 | 10/1992 | Weder et al. | 47/72 |
| 5,156,702 | 10/1992 | Weder | 156/212 |
| 5,181,339 | 1/1993 | Weder et al. | 47/72 |
| 5,274,900 | 1/1994 | Weder | 47/72 |
| 5,400,905 | 3/1995 | Lapalud et al. | 47/72 |

FOREIGN PATENT DOCUMENTS

| | | |
|---|---|---|
| 2036163 | 12/1970 | France . |
| 2477107 | 9/1981 | France . |

OTHER PUBLICATIONS

Exhibit A—The Simple Solution For Those Peak Volume Periods, Speed Cover® 1989©, 6 pages, a brochure published by Highland Supply, 1111 Sixth St., Highland, IL 62249.

Exhibit B—Speed Sheets® And Speed Rolls, ©1990, 2 pages, a brochure published by Highland Supply, 111 Sixth St., Highland, IL 62249.

*Primary Examiner*—Michele K. Yoder
*Attorney, Agent, or Firm*—Dunlap & Codding, P.C.

[57] ABSTRACT

A sheet of material having an upper surface, surface, and an outer periphery, a plurality of indentations in the outer periphery, portions of the sheet of material surrounding the indentations overlapping to form an article having a substantially smooth outer peripheral surface. Methods of forming and using an article, such as a flower pot cover article.

8 Claims, 3 Drawing Sheets

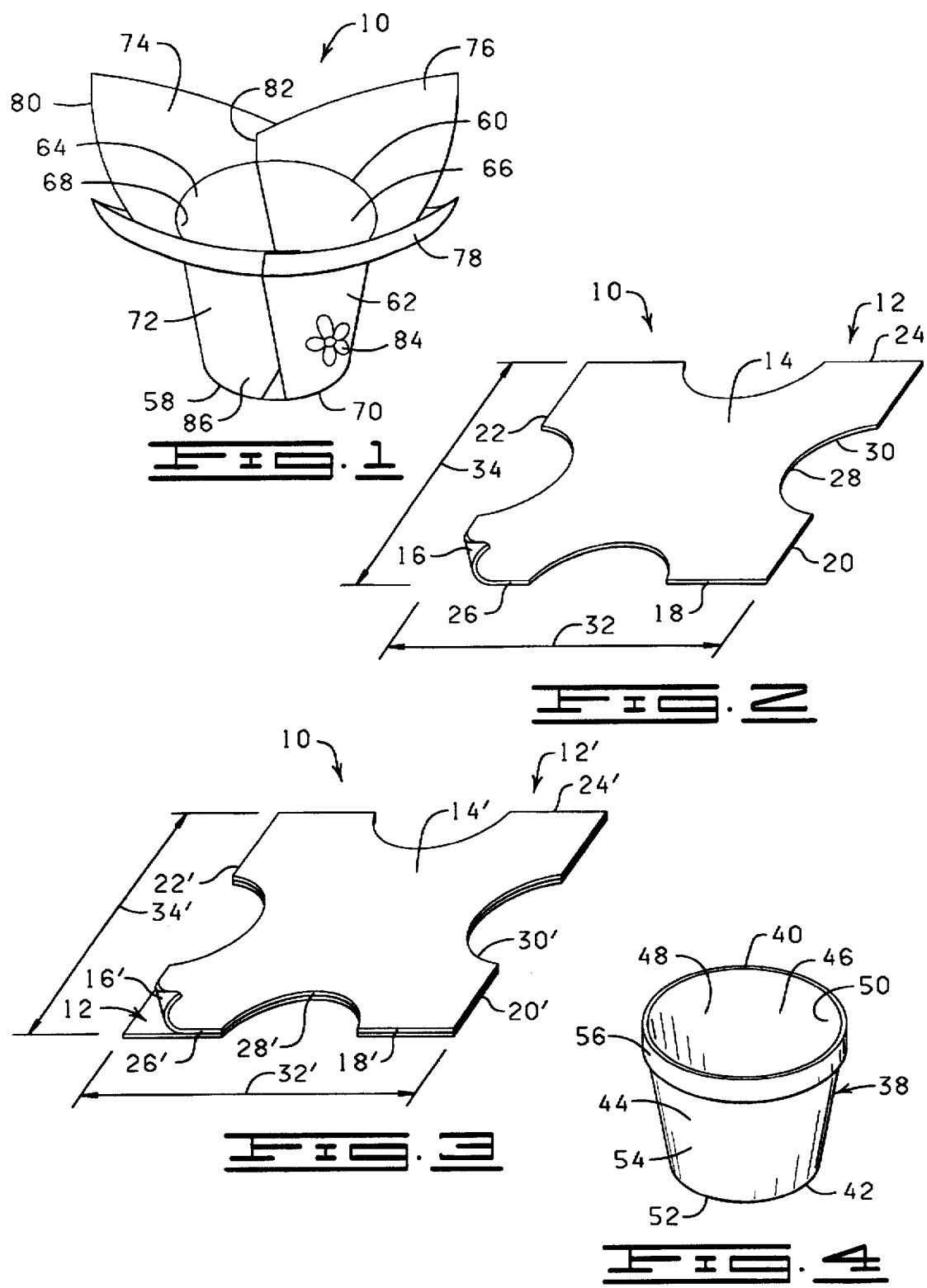

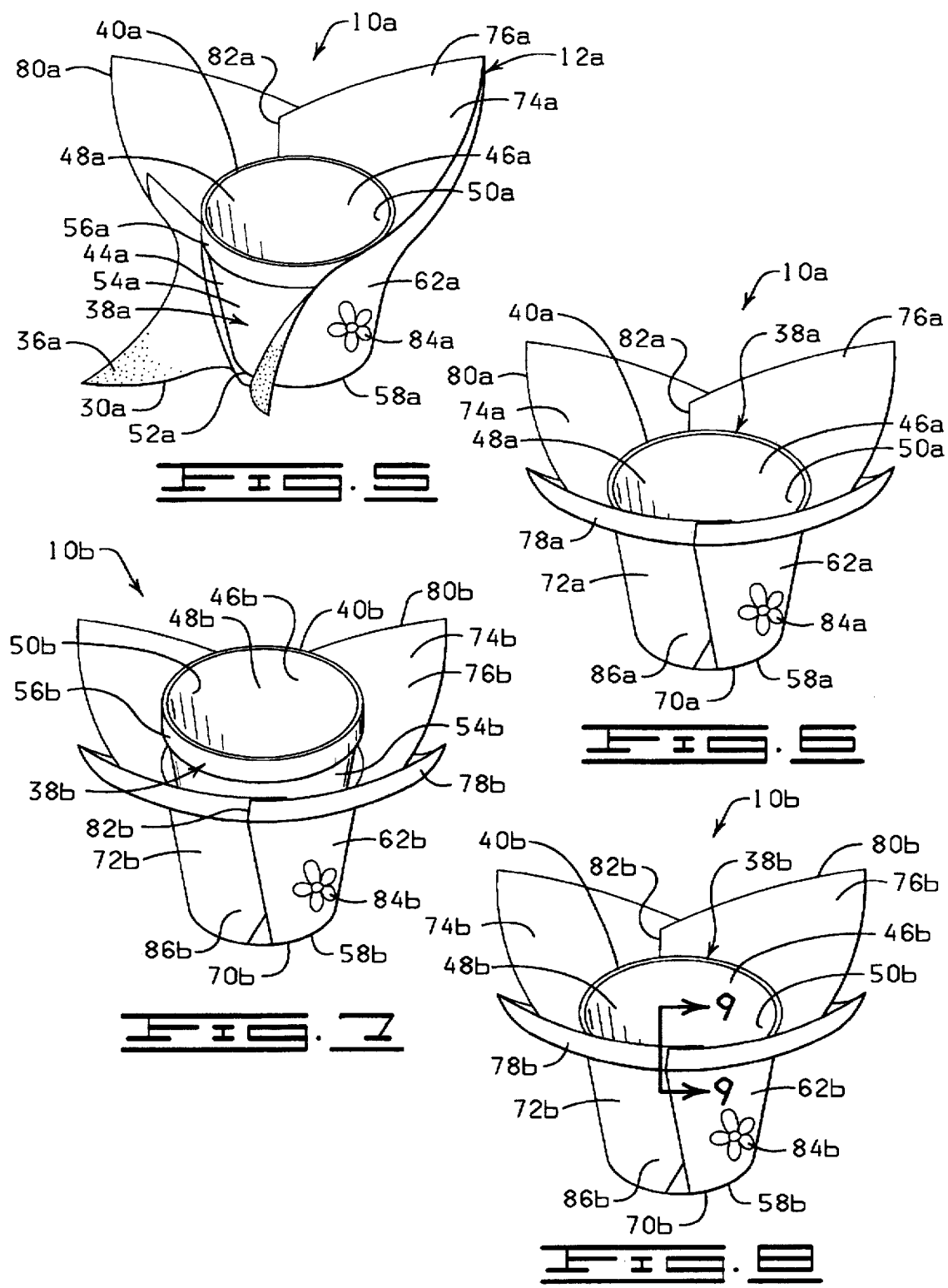

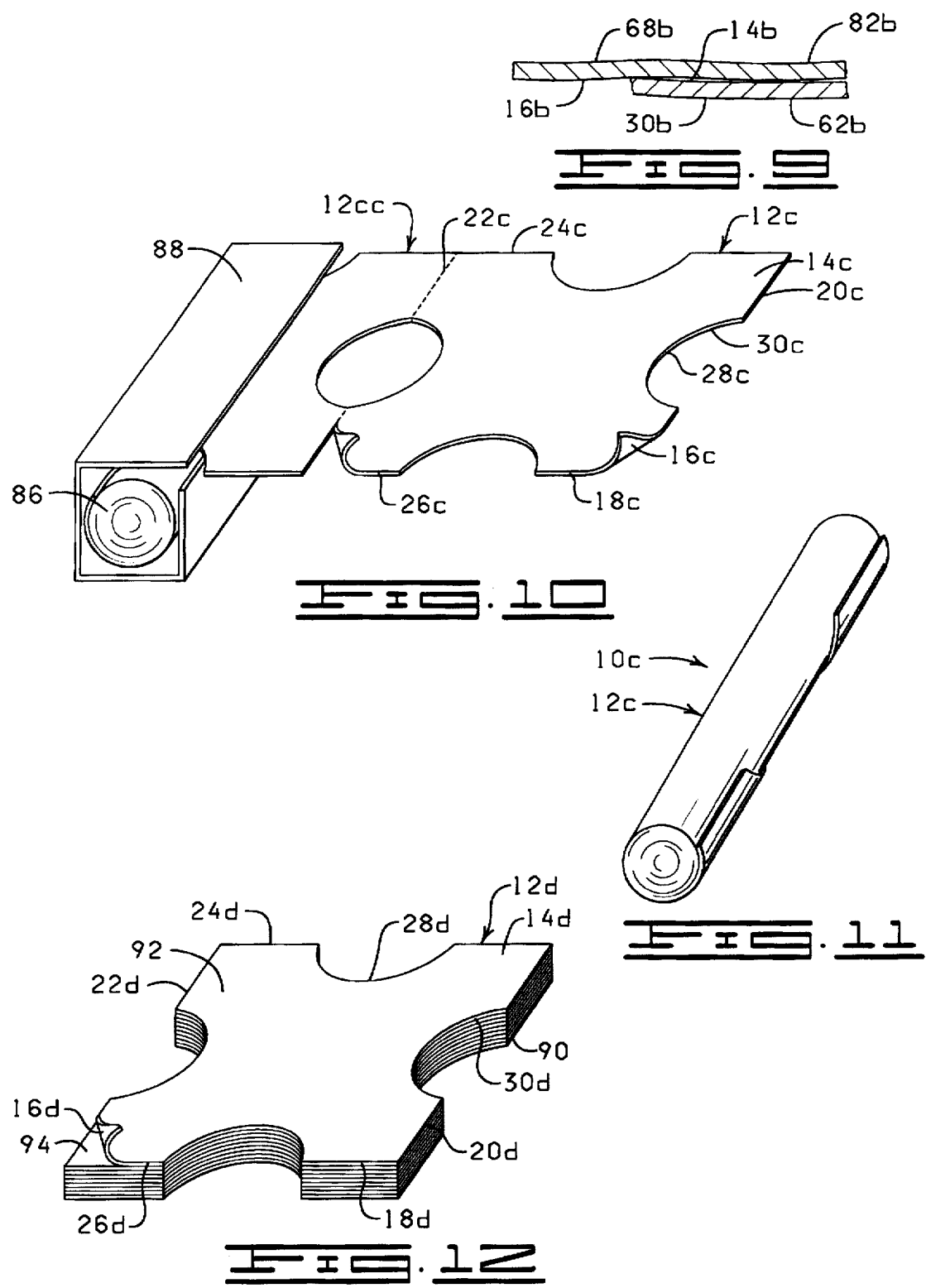

METHOD OF FORMING A FLOWER POT COVER

CROSS REFERENCE TO RELATED APPLICATIONS

This application is also a continuation-in-part of U.S. Ser. No. 08/024,573, filed Mar. 1, 1993, entitled ARTICLE FORMING SYSTEM, now abandoned, which is a continuation of 07/464,694, filed Jan. 16, 1990, entitled ARTICLE FORMING SYSTEM, now U.S. Pat. No. 5,208,027, which is a continuation of U.S. Ser. No. 07/219,083, filed Jul. 13, 1988, entitled ARTICLE FORMING SYSTEM, now U.S. Pat. No. 4,897,031, which is a continuation of 07/004,275, filed Jan. 5, 1987, entitled ARTICLE FORMING SYSTEM, now U.S. Pat. No. 4,773,182 which is a continuation of 06/613,080, filed May 22, 1984, entitled, Article Forming System, now ABANDONED.

This application is also a continuation-in-part of application U.S. Ser. No. 07/968,798, filed Oct. 30, 1992, entitled METHOD AND APPARATUS FOR COVERING PORTIONS OF AN OBJECT WITH A SHEET OF MATERIAL HAVING A PRESSURE SENSITIVE ADHESIVE COATING APPLIED TO AT LEAST A PORTION OF AT LEAST ONE SURFACE OF THE SHEET OF MATERIAL, now U.S. Pat. No. 5,369,934, which is a continuation of U.S. Ser. No. 07/865,563, filed Apr. 9, 1992, entitled METHODS FOR WRAPPING A FLORAL GROUPING, now U.S. Pat. No. 5,245,814, which is a continuation of U.S. Ser. No. 07/649,379, filed Jan. 31, 1991, now U.S. Pat. No. 5,111,638, entitled METHOD FOR WRAPPING AN OBJECT WITH A MATERIAL HAVING PRESSURE SENSITIVE ADHESIVE THEREON, which is a continuation of U.S. Ser. No. 07/249,761, filed Sep. 26, 1988, entitled METHOD FOR WRAPPING AN OBJECT WITH A MATERIAL HAVING PRESSURE SENSITIVE ADHESIVE THEREON, now abandoned.

This application is also a continuation-in-part of application U.S. Ser. No. 07/965,585, filed on Oct. 23, 1992, entitled WRAPPING A FLORAL GROUPING WITH SHEETS HAVING ADHESIVE OR COHESIVE MATERIAL APPLIED THERETO, now abandoned which is a continuation of U.S. Ser. No. 07/893,586, filed Jun. 2, 1992, entitled WRAPPING A FLORAL GROUPING WITH SHEETS HAVING ADHESIVE OR COHESIVE MATERIAL APPLIED THERETO, now U.S. Pat. No. 5,181,364, which is a continuation of U.S. Ser. No. 07/707,417, filed May 28, 1991, entitled WRAPPING A FLORAL GROUPING WITH SHEETS HAVING ADHESIVE OR COHESIVE MATERIAL APPLIED THERETO, now abandoned, which is a continuation of U.S. Ser. No. 07/502,358, filed Mar. 29, 1990, entitled WRAPPING A FLORAL GROUPING WITH SHEETS HAVING ADHESIVE OR COHESIVE MATERIAL APPLIED THERETO, now abandoned, which is also a continuation-in-part of U.S. Ser. No. 07/249,761, filed Sep. 26, 1988, entitled METHOD FOR WRAPPING AN OBJECT WITH A MATERIAL HAVING PRESSURE SENSITIVE ADHESIVE THEREON, now abandoned.

This application is also a continuation-in-part of U.S. Ser. No. 07/889,654, filed May 27, 1992, entitled SELF ADHERING WRAPPING MATERIAL FOR WRAPPING FLOWER POTS AND METHOD OF USING SAME, now U.S. Pat. No. 5,332,610; which is a continuation of U.S. Ser. No. 07/677,225, filed Mar. 29, 1991, entitled METHOD FOR WRAPPING FLOWER POTS USING A SELF ADHERING WRAPPING MATERIAL, now U.S. Pat. No. 5,199,242.

FIELD OF THE INVENTION

This invention generally relates to articles formed by hand, or, alternatively, by article forming systems, and methods of performing and/or using same.

BRIEF DESCRIPTION OF THE DRAWINGS

FIG. 1 is a perspective view of a an article constructed in accordance with the present invention, the article forming a flower pot cover.

FIG. 2 is a perspective view of a sheet of material used to construct the article (flower pot cover) shown in FIG. 1.

FIG. 3 is a perspective view showing a second sheet and the (first) sheet of material disposed adjacent each other.

FIG. 4 is a perspective view showing a flower pot cover object.

FIG. 5 is a perspective view of a method of hand wrapping a flower pot object using a flower pot cover article, the pot object partially wrapped.

FIG. 6 is a perspective view of a hand-wrapped flower pot cover article, showing the pot object wrapped.

FIG. 7 is a perspective view of a method of disposing a flower pot object into a preformed flower pot cover article, the pot object partially disposed in the preformed article.

FIG. 8 is a perspective view of a method of disposing a flower pot object into a preformed flower pot cover article, the pot object disposed in the preformed article.

FIG. 9 is an enlarged cross section partial view of FIG. 8 taken along the lines 9—9 showing a single overlapping portion.

FIG. 10 is a perspective view of a plurality of sheets of material forming a continuous roll of material disposed in a dispenser.

FIG. 11 is a perspective view showing a single roll of material.

FIG. 12 is a perspective view of a pad of sheets of material constructed in accordance with the sheets of material shown in FIGS. 1 and 2.

DESCRIPTION OF THE PREFERRED EMBODIMENTS

The Embodiments of FIGS. 1–4

Shown in FIG. 1 and designated therein by the general reference numeral 10 is an article which is constructed in accordance with the present invention. The article 10 is formed from at least one sheet of material 12. As illustrated in FIG. 2, the sheet of material 12 has an upper surface 14, a lower surface 16, and an outer periphery 18. The outer periphery 18 of the sheet of material 12 may further comprise a first side 20, a second side 22, a third side 24, and a fourth side 26.

As shown in FIG. 2, the sheet of material 12 further comprises a plurality of indentations 28 along each side of the sheet of material 12 (only one of the plurality of indentations designated by the numeral 28) where a portion of the sheet of material 12 has been cut away. Each indentation 28 is, for example, and not by way of limitation, approximately semi-circular in shape. It will be appreciated, however, that the shape and size of each indentation 28 may be geometric, non-geometric, asymmetric, and/or fanciful, as long as each indentation permits the sheet of material 12 to be formed into an article 10, and to function as shown and described herein.

Each of the plurality of indentations 28 is defined by an arcuate, semi-circular area of the outer periphery 18. This arcuate area is termed "arcuate portions" herein. The arcuate portions 30 will be discussed further, and in detail, below.

The sheet of material 12 has a thickness in a range from about 0.1 mils to about 30 mils. The sheet of material 12 frequently has a thickness in a range from about 0.1 mils to about 5 mils. Most commonly, the sheet of material 12 has a thickness in a range from about 1 mils to about 3.5 mils. Alternatively, however, the sheet of material 12 may have a thickness in a range from about 2 mils to about 10 mils.

The sheet of material 12 may comprise any shape and/or size, the shape and size of the sheet 12 shown in FIG. 2 being only by way of example. The sheet of material 12, for example only, may be square, rectangular, circular, or any other geometric shape, non-geometric shape, asymmetric shape, and/or fanciful shape, such as heart shaped, for example.

The sheet of material 12 may be constructed of a single layer of material or a plurality of layers of the same or different types of materials. Any thickness of the sheet of material 12 may be utilized in accordance with the present invention as long as the sheet of material 12 is capable of being formed into the article 10 shown and described herein. The layers of material comprising the sheet of material 12 may be connected together or laminated or may be separate layers, and the layers of material comprising the sheet of material 12 need not be uniform in shape or composition.

The sheet of material 12 has a length 32 extending between the first and the second sides 20 and 22, respectively, of the sheet of material 12. The sheet of material 12 also has a width 34 extending between the third and fourth sides 24 and 26, respectively, of the first sheet of material 12.

At times, as illustrated in FIG. 3, a second sheet of material 12' may be utilized with the sheet of material first described herein, also termed, the "first sheet of material 12". The second sheet of material 12' also has an upper surface 14', a lower surface 16', and an outer periphery 18'. The outer periphery 18' may further comprise a first side 20', a second side 22', a third side 24', and a fourth side 26'.

The second sheet of material 12' also comprises a plurality of indentations 28' along each side of the sheet of material 12' (only one of the plurality of indentations designated by the numeral 28') where a portion of the second sheet of material 12' has been cut away. Each indentation 28' is, for example, and not by way of limitation, approximately semi-circular in shape. It will be appreciated, however, that the shape and size of each of the plurality of indentations 28' may be geometric, non-geometric, asymmetric, and/or fanciful, as long as each indentation 28' permits the second sheet of material 12' to be formed into an article 10, and to function in the manner shown and described herein.

Each of the plurality of indentations 28' in the second sheet of material 12' is defined by an arcuate, semi-circular area of the outer periphery 18'. This arcuate area is termed "arcuate portions" herein. The arcuate portions 30' will be discussed further, and in detail, below.

The second sheet of material 12' also has a length 32' extending between the first and the second sides 20' and 22', respectively, of the second sheet of material 12'. The second sheet of material 12' also has a width 34' extending between the third and fourth sides 24' and 26' of the second sheet of material 12'. It will be understood that the second sheet of material 12' may comprise any of the characteristics, qualities and/or properties, or any combination thereof, shown and described in detail herein for the first sheet of material 12.

The orientation of the first sheet of material 12 and the second sheet of material 12' may be identical. That is, the first and second sheets of material 12 and 12', respectively, may comprise the same shape and size, and may overlap precisely.

In this instance, when a second sheet of material 12' is utilized in addition to the first sheet of material 12, the second sheet of material 12' is placed adjacent the first sheet of material 12 as shown in FIG. 3. In this position, a surface of the second sheet of material 12', such as, for example, the lower surface 16' of the second sheet of material 12', is disposed adjacent a surface of the first sheet of material 12, such as, for example, the upper surface 14 of the first sheet of material 12. The length 32 of the first sheet of material 12 is about equal to the length 32' of the second sheet of material 12' so that, when the first and the second sheets of material 12 and 12' are disposed adjacent each other, the first side 20' of the second sheet of material 12' is generally aligned with the first side 20 of the first sheet of material 12, the second side 22' of the second sheet of material 12' is generally aligned with the second side 22 of the first sheet of material 12. In addition, the width 34 of the first sheet of material 12 is about equal to the width 34' of the second sheet of material 12' so that when the first and the second sheets of material 12 and 12' are disposed adjacent each other, the third side 24' of the second sheet of material 12' is generally aligned with the third side 24' of the first sheet of material 12, and the fourth side 26' of the second sheet of material 12' is generally aligned with the fourth side 26 of the first sheet of material 12.

In another embodiment (not shown), the first sheet and the second sheets of material 12 and 12', respectively, may be layered together so that the first sheet of material 12 and the second sheet of material 12' only partially overlap. In this instance, it will be appreciated that when the first sheet of material 12 and the second sheet of material 12' are disposed adjacent each other, each sheet of material may comprise a different shape and/or size, and portions of both the first and second sheets of material 12 and 12' may not overlap portions of the adjacent sheet of material, said non-overlapping portions which may extend a distance beyond the overlapping portions of the adjacent sheet of material.

It will be understood that multiple sheets of material 12 may be used together. Moreover, when multiple sheets of material 12 are used in combination, the sheets of material 12 need not be uniform in size or shape, and/or, if such sheets of material 12 are uniform in size and shape, they need not be placed in any particular alignment. Finally, it will be appreciated that the sheets of material 12 shown in all embodiments herein are substantially flat.

Turning back to FIG. 2, the sheet of material 12 is constructed from any suitable wrapping material that is capable of being utilized in accordance with the present invention, as shown and described herein. Preferably, the sheet of material 12 comprises paper (untreated or treated in any manner), cellophane, foil, polymer film, fabric (woven or nonwoven or synthetic or natural), burlap, fiber leather, or combinations thereof.

The term "polymer film" means a man-made polymer such as a polypropylene. A polymer film is relatively strong and not as subject to tearing (substantially non-tearable), as might be the case with paper or foil.

The sheet of material 12 may vary in color. Further, the sheet of material 12 may consist of designs or decorative patterns which are printed, etched, and/or embossed thereon using inks or other printing materials. An example of an ink which may be applied to the surface of the sheet of material 12 is described in U.S. Pat. No. 5,147,706 entitled "Water Based Ink On Foil And/Or synthetic organic polymer" issued to Kingman on Sep. 15, 1992 and which is hereby incorporated herein by reference. In addition, the sheet of material 12 may have various colorings, coatings, flocking and/or metallic finishes, or other decorative surface ornamentation applied separately or simultaneously or may be characterized totally or partially by opaque, pearlescent, translucent, transparent, iridescent, neon, or the like, characteristics. Each of the above-named characteristics may occur alone or in combination and may be applied to the upper and/or lower surface of the sheet of material 12. Moreover, each surface of the sheet of material 12 may vary in the combination of such characteristics. The sheet of material 12 may be opaque, translucent or partially clear, colorless, or tinted transparent.

It will be noted that the present invention is described herein as being adapted to form the sheet of material 12 into the predetermined shape of a decorative flower pot cover (also termed herein "plant cover") type of article 10 since one extremely advantageous use of the article 10 of the present invention is to form such decorative flower pot cover types of articles. However, a decorative flower pot cover represents only one article which can be formed into a predetermined shape in accordance with the present invention and the present invention specifically contemplates various and numerous other types of articles such as vases, hats, saucers, baskets (easter, food, gift, and floral baskets), containers for use in microwave ovens, rose stem boxes, egg cartons, potting trays, pans, trays, bowls, basket liners, candy trays, drinking cups, candy cups, flower pots, planter trays for growing plants, disposable bowls and dishes, corsage boxes and containers, food service trays (such as those used for bakery goods, french fries, ground beef, liver and other raw meats in supermarkets, for example), boxes for hamburgers or other "fast food" capable of rapid carry out or delivery, pies and cakes, and the like, and various other articles. The term "article" as used herein is intended to encompass all of the specific articles just mentioned and the term "article" also is intended to be broad enough to encompass any other article having a predetermined shape where the article to function must be capable of substantially maintaining such predetermined shape.

Bonding material 36 may be utilized with any article described and/or disclosed herein. A bonding material 36 may be applied to any portion and/or any surface of any article 10 described herein, as long as such article 10 forms and sustains the characteristics of the article 10 as shown and described in detail herein. Such bonding material 36 bondingly connects the sheet of material 12 to itself and/or an object, thereby forming a flower pot cover article 10.

The term "bonding material" when used herein means an adhesive, preferably a pressure sensitive adhesive, or a cohesive. Where the bonding material is a cohesive, a similar cohesive material must be placed on the adjacent surface for bondingly contacting and bondingly engaging with the cohesive material. The term "bonding material" also includes materials which are heat sealable and, in this instance, the adjacent portions of the material must be brought into contact and then heat must be applied to effect the seal. The term "bonding material" also includes materials which are sonic sealable and vibratory sealable. The term "bonding material" when used herein also means a heat sealing lacquer which may be applied to the sheet of material and, in this instance, heat, or sound waves, or vibrations, also must be applied to effect the sealing.

The term "bonding material" when used herein also means any type of material or thing which can be used to effect the bonding or connecting of the two adjacent portions of the material or sheet of material to effect the connection or bonding described herein. The term "bonding material" also includes ties, labels, bands, ribbons, strings, tape, staples or combinations thereof. Some of the bonding materials would secure the ends of the material while other bonding material may bind the circumference of the wrapper. Another way to secure the wrapping is to heat seal the ends of the material to another portion of the material. One way to do this is to contact the ends with an iron of sufficient heat to heat seal the material.

The term "bonding material" when used herein also means any heat or chemically shrinkable material, and static electrical or other electrical means, magnetic means, mechanical or barb-type fastening means or clamps, curl-type characteristics of the film or materials incorporated in the sheet of material which can cause the material to take on certain shapes, and any type of welding method which may weld portions of the sheet to itself or to the pot, or to both the sheet itself and the pot.

The bonding material 36, as previously described, may comprise a pressure sensitive adhesive. Such use of pressure sensitive adhesives is taught in U.S. Pat. No. 5,111,638, entitled, "Method for Wrapping an Object With a Material Having Pressure Sensitive Adhesive Thereon," and is hereby incorporated by reference herein.

Turning to FIG. 4, the flower pot object 38 has an upper end 40, a lower end 42, and an outer peripheral surface 44. An object opening 46 intersects the upper end 40 of the flower pot object 38, forming a retaining space 48 and an inner peripheral surface 50. A bottom 52 of the flower pot object 38 is disposed at the lower end 42 of the pot object 38 and cooperates to enclose or partially enclose the retaining space 48. The flower pot object 38 also has a base 54 which comprising the outer peripheral surface 44 and extending between the lower end 42 and the upper end 40 of the flower pot object 38.

In the embodiment of the flower pot object 38 shown in FIG. 4, the diameter of the flower pot object 38, generally near the lower end 42, is less than the diameter of the flower pot object 38 generally near the upper end 40, the flower pot object 38 tapering outwardly generally from the lower end 42 toward the upper end 40 thereby giving the flower pot object 38 a generally overall frusto-conically shaped outer peripheral surface 44. In this embodiment, the flower pot object 38 includes a rim 56 formed at the upper end 40 of the flower pot object 38 which extends circumferentially about the flower pot object 38, although it should be noted that some flower pot objects do not include a rim 56 and flower pots also have various shapes as is generally well known, and the present invention is not limited to any particular shape of a flower pot.

The term "flower pot" means any type of floral container used to hold a floral arrangement, floral grouping, or a potted plant. Examples of flower pots used in accordance with the present invention include, but not by way of limitation, clay flower pots, plastic flower pots, and the like. It will be understood, however, that the flower pot object 38 may be any conventional, commercially available container well known in the art.

Growing medium (not shown) may be disposed in the retaining space 48 and a floral grouping (not shown) may be at least partially disposed in the growing media. A portion of the floral grouping may extends a distance upwardly above the upper end 40 of the flower pot object 38.

The term "growing medium" when used herein means any liquid, solid or gaseous material used for plant growth or for the cultivation of propagules, including organic and inorganic materials such as soil, humus, perlite, vermiculite, sand, water, and including the nutrients, fertilizers or hormones or combinations thereof required by the plants or propagules for growth.

"Floral grouping" as used herein means cut fresh flowers, artificial flowers, other fresh and/or artificial plants or other floral materials and may include other secondary plants and/or ornamentation which add to the aesthetics of the overall floral grouping. The floral grouping comprises a flower portion which may comprise either a bloom or foliage portion and a stem portion. A root portion may be disposed in a growing medium. However, it will be appreciated that the floral grouping may consist of only a single bloom or only foliage (not shown). It will also be appreciated that the term "floral arrangement" may be used interchangeably with the term floral grouping.

"Potted plant" as used herein means any living plant which is, or may be, contained within a flower pot object 38. The term "potted plant" also encompasses a botanical item. The term "botanical item" means herein a natural or artificial herbaceous or woody plant, taken singly or in combination. The term "botanical item" also means any portion or portions of natural or artificial herbaceous or woody plants including stems, leaves, flowers, blossoms, buds, blooms, cones, or roots, taken singly or in combination, or in groupings of such portions such as bouquet or floral grouping. Such a potted plant (not shown) has a flower end which may comprise blooms, or merely foliage, and a root end, which may comprise the end of stems, or roots.

FIG. 1 illustrates a flower pot cover article 10 formed in accordance with the present invention. The flower pot cover article 10 includes a lower end 58, an upper end 60, and an outer peripheral surface 62. An object opening 64 intersects the upper end 60 of the flower pot cover article 10, forming a retaining space 66 and an inner peripheral surface 68. A bottom 70 of the flower pot cover article 10 is disposed at the lower end 58 of the pot cover article 10 and cooperates to enclose or partially enclose the retaining space 66. The flower pot cover article 10 also has a base 72 which comprises the outer peripheral surface 62 and extending between the lower end 58 and the upper end 60 of the flower pot cover article 10.

A skirt 74 may form an integral part of the flower pot cover article 10. The skirt 74 extends generally outwardly from the upper end 60 of the pot cover article 10 and the object opening 64 of the flower pot cover article 10. Alternatively, however, the skirt 74 may be formed from a separate portion of the flower pot cover article 10, that is, a separate sheet of material (not shown) may form the skirt 74 which attaches and connects to the upper end 60 of the flower pot cover article 10 in a manner which is well known to those having ordinary skill in the art, the skirt 74 being bonded to the base 72 of the flower pot cover article 10 via bonding material 36.

The skirt 74 has an upper surface 76, a lower surface 78, and an outer periphery 80. It will be appreciated that the skirt, as well as the flower pot cover article 10, may form a variety of geometric, nongeometric, asymmetric, or fanciful shapes. Further, it will be understood that the shape and the size of the skirt 80 may vary with respect to the shape and/or size of the base 72 of the flower pot cover article 10.

A shown in FIGS. 1 and 5–9, the base 72 of the flower pot cover article 10 forms a few selected overlapping portions 82. The overlapping portions 82 (FIG. 9) are formed from an overlap of opposing arcuate portions contained in each of the plurality of indentations 28.

As described above, each of the plurality of indentations 28 has arcuate portions 30. As shown in FIGS. 1 and 5–9, one arcuate portion overlaps an opposing arcuate portions within a singular indentation 28, creating a plurality of overlapping portions 82. The plurality of indentations 28 in the sheet of material 12 and the overlapping portions 82 permit the formation of a pot cover article 10 having a relatively smooth surface, and having only a few, insubstantial number of folds contained therein, or, alternatively, no overlapping folds. Further, the overlapping portions 18 differ from overlapping folds (not shown), because overlapping folds comprise three layers of the sheet of material. That is, an overlapping fold comprises a first layer of the sheet of material 12 (a portion of the fold) which is on the outer peripheral surface 62 of a flower pot cover article 10, a second layer of the sheet of material 12 (another portion of the fold) which is on the inner peripheral surface 68 of the flower pot cover article 10, and a third layer of the sheet of material (yet another portion of the fold) which lies adjacent and between both the layer on the outer peripheral surface 62 and the layer on the inner peripheral surface 68, thereby creating a three layer overlap of the sheet of material 12. Such overlapping folds in a flower pot cover article are shown and described in detail in U.S. Pat. No. 4,773,182, issued Sep. 27, 1988, entitled ARTICLE FORMING SYSTEM, which is hereby incorporated by reference herein.

The overlap of the overlapping portion 82 occurs in the area of the indentation 28, when one arcuate portion 30 overlaps the opposing arcuate portion 30 within a single indentation 28. This overlap creates only a two layer overlap of the sheet of material 12 (FIG. 9). This two layer overlap creates a smoother outer peripheral surface 62, without causing a gathering, pleating, crimping, or bunching of the sheet of material 12 as would otherwise be required, such gathering, pleating, crimping, or bunching of the sheet of material 12 as would occur in the standard overlapping folds formed from standard method of forming pot cover articles. The result, namely, a smooth outer periphery 62 of the flower pot cover article 10, occurs because the plurality of indentations 28 are provided to remove the excess material which would otherwise create a substantial number of overlapping folds, and to permit only the arcuate portions 30 of each of the plurality of indentations 28 to form only a few, selected two-layer overlapping portions 82. When excess material is cut away from the sheet of material 12 via the indentations 28, the surrounding material tends to lie smoothly about the outer peripheral surface 62 once the arcuate portions are overlapped and bonded via bonding material 36, thereby forming the sheet of material 12 into a flower pot cover article 10, said flower pot cover article 10 having no overlapping folds, or, alternatively, only an insubstantial amount of overlapping folds, in the formed flower pot cover article 10.

This great reduction of overlapping folds permits the flower pot cover article 10 to have a smooth, substantially unfolded surface, creating a background for designs 84 (not shown). The term "designs" as used herein includes, but not by way of limitation, any letters, numbers, symbols, and/or any geometric, non-geometric, asymmetric, or fanciful decoration, pattern, and/or design, and/or combinations of any of the foregoing. It will be understood that combined use of the plurality of indentations 28 and overlapping portions 82 created by the arcuate portions 30 permits the formation of a flower pot cover article 10 which provides a substantially non-folded surface in order to illustrate, throughout the flower pot cover article 10, designs 84, or the like, which may be shown throughout the entire flower pot cover article 10, if desired. That is, all structural portions of the flower pot cover article 10 illustrate the design 84 without causing significant distortion of the design due numerous folds. It will be appreciated that when a flower pot cover article 10 is formed using numerous overlapping folds, said overlapping folds distort any design 84 in the sheet of material 12, creating an unattractive appearance, and destroying the continuity of the design 84 which is illustrated structurally by the flower pot cover article 10.

Use of overlapping portions 82 also provides greater ease in formation of the flower pot cover article 10, particularly when the flower pot cover article 10 is formed mechanically. This is because, when overlapping folds are formed, the preset space allotted between the male die and female die of the mold, when the sheet of material 12 is in place and being formed within the mold, must be greater, due to the substantial number of overlapping folds, and due to the triple layer of the sheet of material 12 which occurs at each one of the overlapping folds. This triple layer of each overlapping fold in the sheet of material 12 becomes greater in significance as the thickness of the sheet of material 12 increases. In using overlapping portions 82, however, only a double layer of the sheet of material 12 overlaps into a two layer overlapping portion 82. Further, said overlap occurs only in the area where indentations 28 are present. These two factors allow less space between the male die and the female die when the sheet of material 12 is place in the mold to be formed by the male die and female die, resulting in a flower pot cover article 10 which is easier, mechanically, to form because the male die and the female die of the mold will fit together more concisely, and therefore said dies will properly form the desired flower pot cover article 10 with greater ease and with fewer malformed flower pot cover articles 10 due to improper and imprecise fit between the male and female dies, respectively, of the mold. This better fit of the male and female dies also aids, along with the indentations 28 in the sheet of material 12 and the overlapping portions 82 formed by opposing arcuate portions 30, in the formation of a flower pot cover article 10 having a smoother, substantially unfolded appearance. Therefore, the mechanical device (namely, the male and female dies) the indentations 28, and the overlapping portions 82 cooperating simultaneously to create a flower pot cover article 10 having a substantially smooth outer peripheral surface 62. Further, the flower pot cover article 10 has both an insubstantially number of overlapping folds, or no overlapping folds, and an absence of folds (that is, folds having two layers or three layers) which extending away from the base 72 of the flower pot cover article 10, or toward the retaining space 66 of the flower pot cover article 10. The two layer overlapping portion 82 is contiguous with the base 72 of the flower pot cover article 10.

In one embodiment (not shown), it will be understood that the flower pot cover article 10 formed has, at the lower end 58 and bottom 70 thereof, a contiguous sheet of material 12 which forms the lower end 58 and bottom 70 thereof, and which extends a short distance above the lower end 58 and the bottom 70, which has no portion of the indentation 28 or the overlapping portions 82 of the arcuate portions 30 contained therein. This lower end 58 and bottom 70 may form a saucer section 86 portion of the base 72 since this saucer section 86 contains no indentation 28 nor overlapping section 82, the sheet of material 12 being contiguous in this part of the flower pot cover article 10.

The Embodiments and Method of FIGS. 5–6

Illustrated in FIG. 5 is a modified sheet of material 12a which is constructed exactly like the sheet of material 12 shown in FIG. 2, and described in detail previously, except that the sheet of material 12a is being hand-wrapped about a flower pot object 38a to form a flower pot cover article 10a. Illustrated in FIG. 6 is a flower pot cover article 10a which is constructed exactly like the flower pot cover article 10 shown in FIG. 1, and described in detail previously, except that the flower pot cover article 10a has been formed by hand-wrapping the sheet of material 12a about the flower pot object 38a.

The flower pot cover article 10a is formed from the sheet of material 12a, from the first and second sheets of material 12 and 12', or from multiple sheets of material 12. The flower pot cover article 10a may be formed by hand, by forming the sheet of material 12a about a mold (not shown), or, alternatively, a flower pot object 38a. A general method of forming a flower pot cover article 10a from a sheet of material 12a by hand is described in detail below.

In a general method of hand-wrapping a flower pot object 38a, thereby forming a flower pot cover article 10a, a sheet of material 12a is provided, and a flower pot object 38a is provided. An operator disposes the sheet of material 12a on a relatively horizontal surface (not shown), the lower surface 16a of the sheet of material 12a contacting the horizontal surface. Next, the flower pot object 38a is disposed on the upper surface 14a of the sheet of material 12a. An operator then takes a portion of the sheet of material 12a surrounding one of the plurality of indentations 28a, such as one side of the sheet of material 12a, and raises it upward toward the upper end 40 of the flower pot object 38a. The operator moves one arcuate portion 30a of within the indentation 28a toward the opposing arcuate portion 30a, said arcuate portions 30a which are then overlapped to form a single overlapping portion 82a by overlapping and bondingly connecting one surface, such as the upper surface 14a of the sheet of material 12a near one arcuate portion 30a to at least one other surface, such as the lower surface 16a of the sheet of material 12a near the opposing arcuate portion 30a within the same indentation 28a. Thereafter, the operator forms the remaining, non-overlapping sides of the sheet of material 12a about the flower pot object 38a in a manner identical to the one just described above, until the entire sheet of material 12a is then wrapped around the flower pot object 38a, the sheet of material 12a now being hand-shaped by the operator into the form of a flower pot cover article 10a as disclosed herein, said flower pot cover article 10a having either a minimal, insubstantial number of overlapping folds, or, alternatively, no overlapping folds.

When the flower pot object 38a is operatively wrapped by the sheet of material 12a, the sheet of material 12a forming a flower pot cover article 10a, in the object opening 64a of the flower pot cover article 10a, as shown in FIG. 6, the base 72a of the flower pot cover article 10a substantially encompasses the outer peripheral surface 44a of the flower pot object 38a extending generally between the upper and the lower ends 40a and 42a, respectively of the flower pot object 38a with the upper end 60a of the base 72 of the flower pot cover article 10 being disposed generally near the upper end 40a of the flower pot object 38a and the lower end 58a of the flower pot cover article 10a being disposed generally near the lower end 42a of the flower pot object 10a, the lower end 58a of the flower pot cover article 10a extending across and encompassing the lower end 42a of the flower pot object 38a. In this position, the flower pot cover article 10a operatively connects to the flower pot object 38a, the skirt 74a of the flower pot cover article 10a extending a distance outwardly from the upper end 60a of the flower pot cover article 10a, the flower pot cover article 10a extending generally circumferentially about the base 54a of the flower pot object 38a.

Referring to FIGS. 5–9, whether a sheet of material 12a is hand wrapped about a flower pot object 38a or a potted plant to form a flower pot cover article 10, or whether a sheet of material 12 is preformed into a flower pot cover article 10a (FIGS. 7–8), when the pot object 38a is disposed upon a surface (here, for example, the upper surface 14a) of the sheet of material 12a, the lower end 42a of the pot object 38a rests generally in a central location upon a portion of the (upper) surface. In one embodiment, for example, but not by way of limitation, the upper surface 14a of the sheet of material 12a is formed about and encompasses the outer peripheral surface 44a of the flower pot object 38a, and the base 54a of the flower pot object 38a, the upper portion 14a of the sheet of material 12a forming the object opening 64a, the retaining space 66a, and the inner peripheral surface 68a of the flower pot cover article 10a. The lower surface 16a of the sheet of material 12a, when formed into a flower pot cover article 10a, thereby becomes the outer peripheral surface 62a of the flower pot cover article 10, and the base 72. Generally, the center of the sheet of material 12a becomes the bottom 70a of the flower pot cover article 10a, and the upper surface 14a of the sheet of material 12a continues to extend outward, away from the from the object opening 64a, as does the lower surface 16a of the sheet of material 12a (upper and lower surfaces 14a and 16a forming the inner and outer peripheral surfaces 68a and 62a, respectively, of the flower pot cover article 10a) thereby forming the skirt 74a, the upper surface 14a of the sheet of material 12a forming the upper surface 76a of the skirt 74a, the lower surface 16a of the sheet of material 12a forming the lower surface 78a of the skirt 74a, and the outer periphery 18a of the sheet of material 12a forming the outer periphery 80a of the skirt 74a.

It will be appreciated that the flower pot object opening 46a is in corresponding alignment with the object opening 64a in the flower pot cover article 10a wherein a floral grouping or a potted plant retained within the flower pot object 38a is exposed through both the object opening 64a of the flower pot cover article 10a and the object opening 46a of the flower pot object 38a.

The Embodiments and Method of FIGS. 7–9

Illustrated in FIGS. 7–9 is a flower pot cover article 10b which is constructed exactly like the flower pot cover article 10 shown in FIG. 1, and described in detail previously, the flower pot cover article 10b being preformed into a flower pot cover article 10b.

It will be appreciated that the sheet of material 12 may be automatically and/or mechanically pre-formed into a flower pot cover article 10b before the flower pot object 38b is disposed into a flower pot cover article 10b constructed in accordance with the present invention. Therefore, a preformed flower pot cover article 10b shown in FIGS. 1 and 7–8 and described in detail above is provided, as well as a flower pot object 38b, which is identical to the flower pot cover object 38 shown in FIG. 4, and described in detail previously. The flower pot object 38b is inserted by an operator into the preformed flower pot cover article 10b constructed, preferably via a mold having both male and female dies, from the sheet of material 12, the preformed flower pot cover article 10b retaining its preformed shape, and substantially surrounding and encompassing the flower pot 30b, as previously described in detail above. It will be further appreciate that the preformed flower pot cover article 10b may be disposed either about the outer peripheral surface of a flower pot object 38b, or, alternatively, a potted plant.

Methods of using sheets of material 12 to automatically and/or mechanically make preformed flower pot cover articles 10b via an automatic and/or mechanical mold device having both male and female dies are shown and described in detail in U.S. Pat. No. 4,773,182, issued Sep. 27, 1988, entitled ARTICLE FORMING SYSTEM, U.S. Pat. No. 5,208,027, issued May 4, 1993 entitled ARTICLE FORMING SYSTEM, and U.S. Pat. No. 4,897,031, issued Jan. 30, 1990 entitled ARTICLE FORMING SYSTEM, all of which are hereby incorporated by reference herein. Additional methods of forming a flower pot cover article 10b are described by U.S. Pat. No. 5,076,874, issued Dec. 31, 1991, entitled PROCESS FOR FORMING A PAPER, BURLAP OR CLOTH FLOWER POT COVER, U.S. Pat. No. 5,120,382, issued Jun. 9, 1992, entitled PROCESS FOR FORMING A PAPER, BURLAP OR CLOTH FLOWER POT COVER, and U.S. Pat. No. 5,156,702, issued Oct. 20, 1992, A PROCESS FOR FORMING A PAPER, BURLAP OR CLOTH FLOWER POT COVER, all of which are hereby incorporated by reference herein.

Another method for forming such a flower pot cover article 10b is shown in U.S. Pat. No. 4,733,521 entitled "Cover Forming Apparatus" issued to Weder et al., on Mar. 29, 1988, which is hereby incorporated herein by reference. A further method of securing a flower pot cover article 10b to a flower pot object 38b is by applying a band about the pot object 38b to hold the cover article 10b in place such as is described in U.S. Pat. No. 5,105,599 entitled "Means For Securing A Decorative Cover About A Flower Pot" issued to Weder on Apr. 21, 1992 and which is hereby incorporated herein by reference.

The Embodiments and Method of FIGS. 10–11

Illustrated in FIGS. 10–11 is a modified sheet of material 12c which is constructed exactly like the sheet of material 12 shown in FIG. 2, and described in detail previously, except that the sheet of material 12c comprises a roll 86 of sheets of material 12c contained within a dispenser 88, as shown in FIG. 3. The roll 64 contains an elongated sheet of material 12c comprising a plurality of sheets of material 12c in the roll 86, the sheets of material 12c being connected by perforations to form the roll 86 (the sheet of material 12c shown partially detached and turned upward for illustration purposes only). Such a roll 86 may be provided without a dispenser 88 as well (FIG. 11). Such rolls 86 permit one sheet of material 12c to be withdrawn from the roll 86, and the sheet of material 12c is detached or severed from the roll 86. Alternatively, the roll 86 may simply be formed as a continuous roll 86 without perforations (not shown), and the material may be withdrawn from the roll 86 and a portion may be severed into separate sheets of material 12c by a serrated cutting edge (not shown) contained within the dispenser 88, or by a separate cutting element (not shown). Any number of sheets of material 12c may form the roll 86 as long as it is possible to withdraw at least one sheet of material 12c from the roll 86.

One or more sheets of material 12c may be removed from a roll 86, and may be wrapped about a flower pot object 38 or a potted plant, or formed into a preformed flower pot cover article 10. Both of these methods of use are shown and described in detail herein.

The Embodiments and Method of FIG. 12

Illustrated in FIG. 12 is a modified sheet of material 12d which is constructed exactly like the sheet of material 12 shown in FIG. 2, and described in detail previously, except that the sheet of material 12d comprises a plurality of sheets of material 12d connected together to form a pad 90 of sheets of material 12d. The pad 90 comprises a plurality of sheets of material 12d stacked one on top of the other and positioned so that the periphery 18d, that is, the first sides 20d, the second sides 22d, the third sides 24d, and the fourth sides 28d of sheets of material 12d in the pad 90 generally are aligned.

Referring to FIG. 12, the pad 90 further comprises a top sheet of material 92 and a next sheet of material 94 disposed thereunder, the other sheets of material 12d being disposed generally under the next sheet of material 94 in the pad 90 of sheets of material 12d. Each sheet of material 12d in the pad 90d may have a bonding material 36d (not shown) disposed thereupon, near at least a portion of the periphery 18d of each sheet of material 12d, and each sheet of material 12d having a bonding material 36d thereon is bondingly connectable to a portion of another sheet of material 12d for cooperating to connect the sheets of material 12d into the pad 90.

The top sheet of material 92 is capable of being disconnected from the pad 90 of sheets of material 12d. When the top sheet of material 92 is disconnected, the next sheet of material 94 forms the new top sheet of material 90, and the sheet of material 12d lying under the new top sheet of material 92 forms a new next sheet of material 94.

A bonding material 36 (not shown) on each sheet of material 12d bondingly and releasably connects each sheet of material 12d to one other sheet of material 12a whereby one of the sheets of material 12d can be releasably disconnected from another sheet of material 12d by pulling the sheets of material 12d apart. Further, the bonding material 36d bondingly and releasably connects each sheet of material 12d to portions of itself.

A pad of sheets of material similar to those shown and described herein are disclosed in U.S. Pat. No. 5,181,364, issued Jan. 26, 1993 to Weder, entitled WRAPPING A FLORAL GROUPING WITH SHEETS HAVING ADHESIVE OR COHESIVE MATERIAL APPLIED THERETO, which is hereby incorporated by reference herein.

One or more sheets of material 12d may be removed from the pad 90 of sheets of material 12d, and may be wrapped about a flower pot object 38 or a potted plant, or formed into a preformed flower pot cover article 10. Both of these methods of use are shown and described in detail herein.

Changes may be made in the construction and the operation of the various components, elements and assemblies described herein or in the steps or the sequence of steps of the methods described herein without departing from the spirit and scope of the invention as defined in the following claims.

What is claimed is:

1. A method for forming a flower pot cover used to cover a flower pot having differing shapes, said flower pot having a lower end and an outer periphery, said method comprising the steps of:

providing an unscored sheet of material having an upper surface, a lower surface, and an outer periphery, the sheet of material having at least one indentation formed in the outer periphery;

forming the sheet of material into a flower pot cover by overlapping portions of the sheet of material surrounding the indentation, said overlapped portions extending below said indentation when said sheet is formed into said cover, thereby forming overlapping portions, wherein said flower pot cover comprises a base having a closed lower end, an upper end, an object opening extending through said upper end and an outer peripheral surface extending between the upper end and the closed lower end, the base having a skirt formed therewith, said skirt extending a distance from the opening, and wherein a saucer portion is formed in the closed lower end of the flower pot cover when the flower pot cover is formed, said saucer portion extending a distance upward from said lower end, the indentation not extending into any portion of the saucer portion, the saucer portion being formed from a portion of the sheet, of material wherein said portion is selected from the group consisting of polymer film, cellophane, foil and combinations thereof, wherein said saucer portion is sized to extend upwardly about a pot having a lower end and an outer periphery when said flower pot is disposed in the flower pot cover, said saucer portion encompassing the lower end and a portion of the outer periphery of the pot, and sealing the overlapping portions of the sheet of material such that said overlapping portions cooperate to retain the flower pot cover in a predetermined shape.

2. The method of claim 1 wherein in the step of sealing the overlapping portions, the overlapping portions are sealed via a bonding material.

3. The method of claim 1 wherein in the step of providing a sheet of material, the sheet of material further comprises a design.

4. The method of claim 1 wherein in the step of forming the sheet of material into the flower pot cover, the flower pot cover further comprises a skirt.

5. A method of forming a preformed flower pot cover used to cover a flower pot having differing shapes, said flower pot having a lower end and an outer periphery, said method comprising the steps of:

providing a preformed flower pot cover having a saucer portion formed therein, said preformed flower pot cover having a base having a closed lower end, an upper end an object opening extending through said upper end and an outer peripheral surface extending between the upper end and the closed lower end, the base having a skirt formed therewith, said skirt extending a distance from the opening, the preformed flower pot cover being formed from an unscored sheet of material having an upper surface, a lower surface and an outer periphery, the sheet of material having at least one indentation formed in the outer periphery;

wherein the sheet of material is preformed into the flower pot cover, said preformed flower pot cover formed having overlapped portions of the sheet of material surrounding said indentation, said overlapped portions extending below said indentation when said sheet is formed, thereby forming overlapping portions, wherein a saucer portion is formed in the closed lower end of the preformed flower pot cover when the preformed flower pot cover is formed, said saucer portion extending a distance upward from said lower end, the indentation not extending into any portion of the saucer portion, the saucer portion being formed from a portion of the sheet of material wherein said portion is selected from the group consisting of polymer film, cellophane, foil and combinations thereof, wherein said saucer portion is sized to extend upwardly about a pot having a lower end and an outer periphery when said pot is disposed in the flower pot cover, said saucer portion encompassing the lower end and a portion of the outer periphery of the pot, wherein the overlapping portions of the sheet of material are sealed when the preformed flower pot cover is formed thereby forming sealed portions, said sealed portions cooperating to retain the preformed flower pot cover in a predetermined shape.

6. The method of claim 5 wherein in the step of sealing the overlapping portions, the overlapping portions are sealed via a bonding material.

7. The method of claim 5 wherein in the step of providing a sheet of material, the sheet of material further comprises a design.

8. The method of claim 5 wherein in the step of forming the article, the article further comprises a skirt.

\* \* \* \* \*

UNITED STATES PATENT AND TRADEMARK OFFICE
CERTIFICATE OF CORRECTION

PATENT NO. : 5,716,474   Page 1 of 6

DATED : February 10, 1998

INVENTOR(S) : Donald E. Weder et al.

It is certified that error appears in the above-identified patent and that said Letters Patent is hereby corrected as shown below:

Sheet 3 of 3, Figure 10, please delete the drawing element "86", and substitute therefor --87-- as illustrated below:

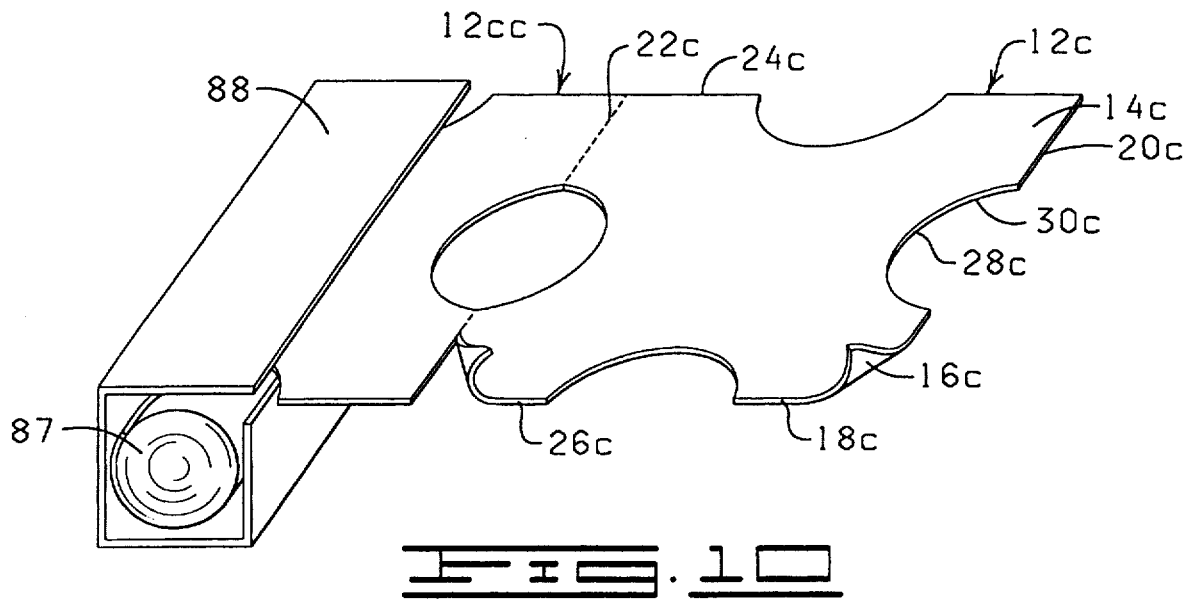

UNITED STATES PATENT AND TRADEMARK OFFICE
CERTIFICATE OF CORRECTION

PATENT NO.    :    5,716,474

DATED    :    February 10, 1998

INVENTOR(S)    :    Donald E. Weder et al.

It is certified that error appears in the above-identified patent and that said Letters Patent is hereby corrected as shown below:

Sheet 3 of 3, Figure 11, please insert drawing element --87-- as illustrated below:

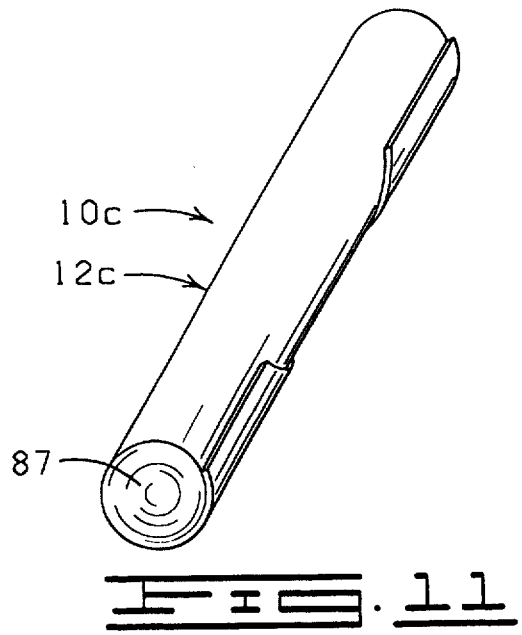

FIG. 11

UNITED STATES PATENT AND TRADEMARK OFFICE
CERTIFICATE OF CORRECTION

PATENT NO.     :   5,716,474

DATED          :   February 10, 1998

INVENTOR(S)    :   Donald E. Weder et al.

It is certified that error appears in the above-identified patent and that said Letters Patent is hereby corrected as shown below:

Column 5, line 3, please delete "synthetic organic polymer", and substitute therefor --Synthetic Organic Polymer--.

Column 7, line 64, please delete "80", and substitute therefor --74--.

Column 8, line 13, please delete "18", and substitute --82--.

Column 9, line 30, please delete "place", and substitute --placed--.

Column 10, line 60, please delete "72", and substitute therefor --72a--.

Column 10, line 61, please delete "10", and substitute therefor --10a--.

Column 11, line 7, please delete "5-9", and substitute therefor --5-6--.

Column 11, line 9, please delete "10", and substitute therefor --10a--.

Column 11, line 10, please delete "12", and substitute therefor --12a--.

Column 11, line 11, please delete "10a", and substitute therefor --10b--.

UNITED STATES PATENT AND TRADEMARK OFFICE
CERTIFICATE OF CORRECTION

PATENT NO.    :    5,716,474

DATED         :    February 10, 1998

INVENTOR(S)   :    Donald E. Weder et al.

It is certified that error appears in the above-identified patent and that said Letters Patent is hereby corrected as shown below:

Column 11, line 25, please delete "10", and substitute therefor --10a--.

Column 11, line 26, please delete "72", and substitute therefor --72a--.

Column 11, line 67, please delete "12", and substitute therefor --12b--.

Column 12, line 8, please delete "12", and substitute therefor --12b--.

Column 12, line 45, please delete "86", and substitute therefor --87--.

Column 12, line 47, please delete "64", and substitute therefor --87--.

Column 12, line 49, please delete "86", and substitute therefor --87--.

Column 12, line 50, please delete "86", and substitute therefor --87--.

Column 12, line 52, please delete "86", and substitute therefor --87--.

UNITED STATES PATENT AND TRADEMARK OFFICE
CERTIFICATE OF CORRECTION

PATENT NO.   :   5,716,474                          Page 5 of 6
DATED        :   February 10, 1998
INVENTOR(S)  :   Donald E. Weder et al.

It is certified that error appears in the above-identified patent and that said Letters Patent is hereby corrected as shown below:

Column 12, line 53, please delete "86", and substitute therefor --87--.

Column 12, line 54, please delete "86", and substitute therefor --87--.

Column 12, line 56, before 'Alternatively,' please delete "86.", and substitute therefor --87.--.

Column 12, line 56, after 'roll', please delete "86", and substitute therefor --87--.

Column 12, line 57, please delete "86", and substitute therefor --87--.

Column 12, line 58, please delete "86", and substitute therefor --87--.

Column 12, line 62, please delete "86", and substitute therefor --87--.

Column 12, line 64, please delete "86", and substitute therefor --87--.

Column 12, line 66, after 'roll', please delete "86", and substitute therefor --87--.

Column 12, line 66, after 'object', please delete "38", and substitute therefor --38c--.

UNITED STATES PATENT AND TRADEMARK OFFICE
CERTIFICATE OF CORRECTION

PATENT NO. : 5,716,474

DATED : February 10, 1998

INVENTOR(S) : Donald E. Weder et al.

It is certified that error appears in the above-identified patent and that said Letters Patent is hereby corrected as shown below:

```
Column 13, line 1, please delete "10", and substitute therefor
--10c--.

Column 13, line 34, please delete "36", and substitute therefor
--36d--.

Column 13, line 36, please delete "12a", and substitute therefor
--12d--.

Column 13, line 50, please delete "38", and substitute therefor
--38d--.

Column 13, line 51, please delete "10", and substitute therefor
--10d--.
```

Signed and Sealed this

Tenth Day of November 1998

*Attest:*

BRUCE LEHMAN

*Attesting Officer*     *Commissioner of Patents and Trademarks*